Oct. 29, 1929.    F. E. BANFIELD, JR., ET AL    1,733,641
OIL CUP
Filed Nov. 18, 1925

INVENTORS.
Frederic E. Banfield Jr.,
and
BY Frank O. Hoagland
J. H. McCready
their ATTORNEY.

Patented Oct. 29, 1929

1,733,641

UNITED STATES PATENT OFFICE

FREDERIC E. BANFIELD, JR., OF SACO, MAINE, AND FRANK O. HOAGLAND, OF BRIDGEPORT, CONNECTICUT, ASSIGNORS TO SACO-LOWELL SHOPS, OF BOSTON, MASSACHUSETTS, A CORPORATION OF MASSACHUSETTS

OIL CUP

Application filed November 18, 1925. Serial No. 69,772.

This invention relates to oil cups and similar devices used in lubricating machine parts.

It is often desirable to use oil cups on rapidly moving machine elements where the motion of the part tends to throw the oil out of the cup. For example, when an oil cup is used on a loose pulley the centrifugal force throws the oil out of the cup even though a very good cover is used on the cup. This is objectionable not only because the oil is thrown on the floor or on adjacent machinery where it is a nuisance, but more especially because it robs the friction surfaces of their supply of oil. The present invention aims to devise an oil cup which will overcome the objections above described. It is also an object of the invention to devise a construction of this character which can be manufactured economically, will be convenient to use, and will give a long period of service without care, attention or repairs.

The nature of the invention will be readily understood from the following description when read in connection with the accompanying drawings, and the novel features will be particularly pointed out in the appended claims.

Referring now to the drawings.

Figure 1:
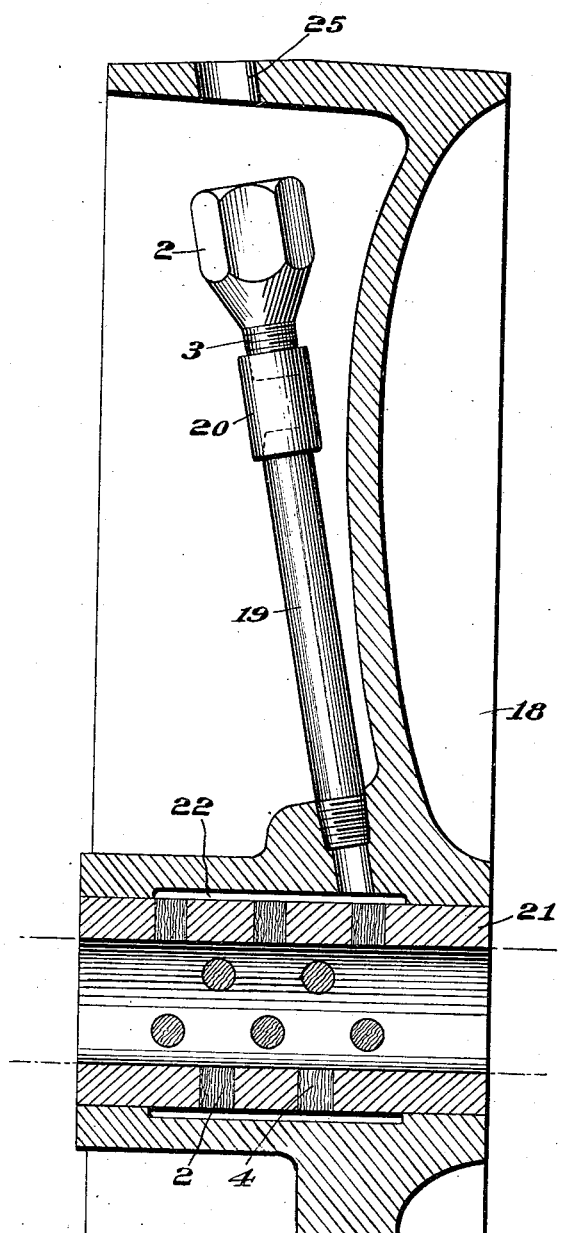
Figure 1 is a cross-sectional view through a part of a loose pulley showing it equipped with an oil cup embodying this invention.

The oil cup shown comprises a body 2 which may conveniently be turned from a section of hexagonal bar stock. This body has a screw-threaded shank 3, and it is drilled to provide an internal chamber 4 and an outlet 5 leading from this chamber through the shank 3. The upper end of the body is counterbored to form a shoulder 6 on which is seated a packing disk 7 which may consist of leather, fibre, or any other suitable material, this disk being held securely in its seat by a metal washer 8 which forms the top of the oil cup. Preferably the upper part of the body 2 is reduced to a relatively thin edge 9 which, when the assembling operations have been completed, is spun or crimped over to secure the washer 8 and packing 9 firmly in their proper positions.

Figure 2:
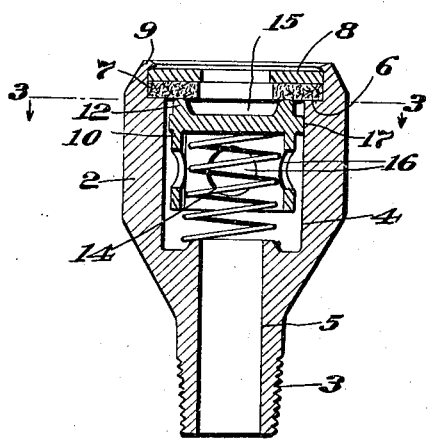
Fig. 2 is a vertical, central, cross-sectional view of the oil cup shown in Fig. 1.
Figure 3:
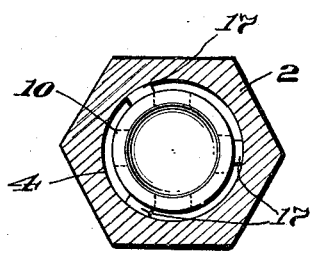
Fig. 3 is a transverse, cross-sectional view on the line 3—3, Fig. 2.

Mounted in the chamber 4 is an inverted cup-shaped plunger 10 having a rim 12 at its upper end to seat against the packing 7. A coiled spring 14, partly housed in the plunger, normally holds the plunger in its uppermost position, as shown in Fig. 2. Both the washer 8 and packing disk 7 are provided with central apertures which form the inlet for the oil, and this inlet lies directly over a central depression 15 in the plunger 10.

In using the device an oil can nozzle is inserted through the inlet opening and is pushed against the depression 15, thus forcing the plunger 10 inwardly. Oil then is forced into the oil cup until it is filled, or the desired amount has been introduced. Since the aperture in the washer 8 is smaller than that in the packing disk 7, the latter is protected from being damaged by the spout of the oil can. As soon as the nozzle is withdrawn the spring 14 immediately closes the plunger 10 again. The oil can flow freely around the plunger due to the fact that it is spaced from the wall of the chamber 4, and even if it should be forced against the bottom of the chamber, oil still could flow through the holes 16 formed through the sides of the plunger. As the plunger is moved up or down it is guided by three lugs 17 which project laterally from the plunger 10. This insures the proper seating of the rim 12 of the plunger against the packing 7 where it will seal the inlet against the escape of oil therethrough.

Fig. 1 shows a typical installation on a loose pulley 18, the oil cup 2 being connected to the hub of the pulley by a short piece of pipe 19 and a pipe sleeve 20. This pulley is provided with a bronze bushing 21 which is surrounded by an oil chamber 22 with which the oil cup communicates through the pipe 19. Oil is fed from the chamber 22 to the bearing surface of the bushing 12 through a series of wooden plugs 24 which conduct the oil by capillarity. A hole 25 is drilled through the rim of the pulley in line with the axis of the cup 2 to admit an oil can nozzle and permit the filling of the oil cup in the manner above described.

It will now be evident that this invention provides an oil cup construction which can be manufactured economically, is sturdy and substantial in construction so that it will give a long period of service without requiring repair or attention. The most important advantage of the construction, however, is the fact that it prevents leakage of the oil from the cup during operation. That is, the escape of oil is effectually prevented by the plunger 10 and the packing 7, the plunger being held firmly against the packing both by the spring 14 and also by centrifugal force.

While we have herein shown and described the best embodiment of our invention that we have so far devised, it is contemplated that the invention may be embodied in other forms without departing from the spirit or scope thereof.

Having thus described our invention, what we desire to claim as new is:

1. An oil cup comprising a hollow body, a top for said body having an inlet opening therethrough, a packing surrounding said opening and located immediately below said top, an inverted cup-shaped plunger mounted within said body with the upper end thereof arranged to bear on said packing to close said opening, the body of said plunger being spaced from the wall of the chamber in said body, a coiled spring partly housed in said plunger and normally holding the plunger against said packing, whereby the plunger may be depressed against the tension of said spring by an oil can nozzle inserted through said opening, and means for guiding said plunger for sliding movement toward and from said packing.

2. An oil cup comprising a hollow body having a seat in the upper end thereof, a packing disk positioned in said seat, a washer resting on said disk, the edge of said body being crimped over said washer, said washer and disk being apertured to provide an inlet for said cup, an inverted cup-shaped plunger mounted in said body and provided with a raised rim on its upper end to engage said packing and close said inlet, and a coiled spring for holding said plunger in its closed position, said plunger being spaced from the wall of the chamber in said body and having lugs projecting therefrom to engage said walls and guide said plunger.

3. An oil cup comprising a hollow body, a top for said body having an inlet opening therethrough, a packing disk surrounding said opening and located immediately below said top, a plunger slidably mounted within said body, said plunger having a raised rim at the upper end thereof to bear against said packing and thereby close said opening, the body of said plunger being spaced from the wall of the chamber in said body, a coiled spring acting on said plunger to hold said raised rim normally pressed against said packing, and means for guiding said plunger for sliding movement toward and from said packing, the upper end of said plunger having a depression in alinement with said opening whereby an oil can nozzle may be inserted through said opening to depress the plunger.

In testimony whereof we have hereunto signed our names to this specification.

FREDERIC E. BANFIELD, JR.
FRANK O. HOAGLAND.